(12) United States Patent
Ayukawa

(10) Patent No.: US 10,220,882 B2
(45) Date of Patent: Mar. 5, 2019

(54) VEHICLE BODY LOWER PORTION STRUCTURE

(71) Applicant: TOYOTA JIDOSHA KABUSHIKI KAISHA, Toyota-shi, Aichi-ken (JP)

(72) Inventor: Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/730,087

(22) Filed: Oct. 11, 2017

(65) Prior Publication Data

US 2018/0148099 A1  May 31, 2018

(30) Foreign Application Priority Data

Nov. 30, 2016 (JP) ................. 2016-233124

(51) Int. Cl.
| | | |
|---|---|---|
| *B62D 21/15* | (2006.01) | |
| *B62D 25/02* | (2006.01) | |
| *B62D 25/20* | (2006.01) | |
| *B62D 29/00* | (2006.01) | |

(52) U.S. Cl.
CPC ......... *B62D 21/155* (2013.01); *B62D 21/152* (2013.01); *B62D 21/157* (2013.01); *B62D 25/025* (2013.01); *B62D 25/20* (2013.01); *B62D 25/2009* (2013.01); *B62D 25/2036* (2013.01); *B62D 29/008* (2013.01)

(58) Field of Classification Search
CPC .. B62D 21/152; B62D 21/155; B62D 21/157; B62D 25/025; B62D 25/20; B62D 25/2036

USPC ............... 296/187.08, 187.12, 193.07, 209
See application file for complete search history.

(56) References Cited

U.S. PATENT DOCUMENTS

| | | | | |
|---|---|---|---|---|
| 5,619,784 | A  * | 4/1997 | Nishimoto | B62D 65/04 29/430 |
| 8,011,721 | B2 * | 9/2011 | Yamada | B62D 25/02 296/209 |
| 8,308,227 | B2 * | 11/2012 | Tsuruta | B62D 21/157 296/209 |
| 8,608,230 | B2 * | 12/2013 | Young | B60K 1/04 296/187.02 |
| 8,696,051 | B2 | 4/2014 | Charbonneau et al. | |
| 8,702,161 | B2 | 4/2014 | Charbonneau et al. | |
| 9,738,324 | B1 * | 8/2017 | Vigil | B62D 25/04 |

(Continued)

FOREIGN PATENT DOCUMENTS

| | | |
|---|---|---|
| JP | 2013-256265 A | 12/2013 |
| JP | 2015-227124 A | 12/2015 |
| JP | 2016-052834 A | 4/2016 |

*Primary Examiner* — Gregory A Blankenship
(74) *Attorney, Agent, or Firm* — Oliff PLC

(57) ABSTRACT

A vehicle body lower portion structure includes: a lower frame member formed as a chamber that extends in a vehicle body longitudinal direction, having a guide portion at inner surfaces of wall portions that structure the chamber, the lower frame member being disposed at a vehicle body lower side; and a reinforcing member formed as a second chamber that extends in the vehicle body longitudinal direction, having a plurality of projections at outer surfaces of wall portions that structure the second chamber, the reinforcing member being provided within the chamber of the lower frame member in a state in which the plurality of projections are made to contact the guide portion.

17 Claims, 9 Drawing Sheets

(56) References Cited

U.S. PATENT DOCUMENTS

| | | | |
|---|---|---|---|
| 9,821,854 B2* | 11/2017 | Bach | B62D 25/025 |
| 2012/0161429 A1* | 6/2012 | Rawlinson | B60N 2/012 |
| | | | 280/801.1 |
| 2012/0161472 A1* | 6/2012 | Rawlinson | B60K 1/04 |
| | | | 296/187.08 |
| 2014/0265443 A1* | 9/2014 | Meaige | B62D 29/002 |
| | | | 296/187.02 |
| 2016/0311301 A1* | 10/2016 | Ikeda | B62D 29/001 |
| 2016/0325786 A1* | 11/2016 | Elfwing | B62D 25/025 |
| 2017/0305251 A1* | 10/2017 | Hara | B60K 1/04 |
| 2018/0134320 A1* | 5/2018 | Jeong | B62D 25/025 |
| 2018/0148099 A1* | 5/2018 | Ayukawa | B62D 21/155 |
| 2018/0148106 A1* | 5/2018 | Ayukawa | B60L 11/1879 |

* cited by examiner

… (1)

VEHICLE BODY LOWER PORTION STRUCTURE

CROSS-REFERENCE TO RELATED APPLICATION

This application claims priority under 35 USC 119 from Japanese Patent Application No. 2016-233124, filed Nov. 30, 2016, the disclosure of which is incorporated by reference herein in its entirety.

BACKGROUND

Technical Field

Preferred embodiments relate to a vehicle body lower portion structure.

Related Art

Structures in which a reinforcing member that has a chamber structure is inserted into and disposed within a chamber of a lower frame member, such as a rocker or the like, are conventionally known (see, for example, U.S. Pat. No. 8,702,161). A guide portion, which has guide surfaces that prescribe the position of the reinforcing member, is provided at the lower frame member, and the reinforcing member is inserted along the guide surfaces of this guide portion.

SUMMARY

However, in such a structure, at the time of inserting the reinforcing member into the chamber of the lower frame member, the frictional force between the reinforcing member and the guide surfaces at the guide portion is large, and there is the concern that it may be difficult to insert the reinforcing member easily.

Namely, in such a structure, there is room for improvement from the standpoint of the produceability of the lower frame member.

In consideration of the above circumstances, an object of preferred embodiments is to provide a vehicle body lower portion structure that, in a structure in which a reinforcing member having a chamber structure is inserted into and provided within the chamber of a lower frame member, can improve the produceability of the lower frame member.

A vehicle body lower portion structure of a first aspect of the disclosure includes: a lower frame member formed as a chamber that extends in a vehicle body longitudinal direction, and having a guide portion at inner surfaces of wall portions that structure the chamber, and the lower frame member being disposed at a vehicle body lower side; and a reinforcing member formed as a second chamber that extends in the vehicle body longitudinal direction, and having plural projections at outer surfaces of wall portions that structure the second chamber, and the reinforcing member being provided within the chamber of the lower frame member in a state in which the plural projections are made to contact the guide portion.

In accordance with the vehicle body lower portion structure of the first aspect, the plural projections, which are formed at the outer surfaces of the wall portions that structure the second chamber of the reinforcing member, contact the guide portion that is formed at the inner surfaces of the wall portions that structure the chamber of the lower frame member. Namely, the reinforcing member is inserted into and provided within the chamber of the lower frame member while the plural projections are made to contact the guide portion. Accordingly, the frictional force at the time of insertion is reduced as compared with a structure in which the reinforcing member is inserted into and provided within the chamber of the lower frame member while the outer surfaces of the wall portions of the reinforcing member are made to contact the guide portion. Accordingly, the produceability of the lower frame member is improved.

Further, in a vehicle body lower portion structure of a second aspect of the disclosure, in the first aspect, a battery installed on a battery frame is configured to be disposed at a vehicle transverse direction inner side of the lower frame member, and, in a side view seen in a vehicle transverse direction, at least a portion of the reinforcing member overlaps with the battery or the battery frame.

In accordance with the vehicle body lower portion structure of the second aspect, in the side view seen in the vehicle transverse direction, at least a portion of the reinforcing member overlaps with the battery or the battery frame. Accordingly, the collision load that is inputted at the time of a side collision of the vehicle is transmitted to the battery or the battery frame via the reinforcing member, as compared with a structure in which the reinforcing member does not overlap with the battery or the battery frame in a side view seen in the vehicle transverse direction. Accordingly, deformation of the vehicle cabin is suppressed, and the collision safety performance at the time of a side collision of the vehicle is improved.

In a vehicle body lower portion structure of a third aspect of the disclosure, in the second aspect, the battery frame has a cross member that extends in the vehicle transverse direction and the battery is sectioned into front and rear portions by the cross member, and at least a portion of the reinforcing member is configured to overlap with the cross member in the side view seen in the vehicle transverse direction.

In accordance with the vehicle body lower portion structure of the third aspect, at least a portion of the reinforcing member overlaps with the cross member of the battery frame, in the side view seen in the vehicle transverse direction. Accordingly, the collision load that is inputted at the time of a side collision of the vehicle is transmitted to the cross member of the battery frame via the reinforcing member, as compared with a structure in which the reinforcing member does not overlap with the cross member of the battery frame in a side view seen in the vehicle transverse direction. Accordingly, deformation of the vehicle cabin is further suppressed, and the collision safety performance at the time of a side collision of the vehicle is improved.

In a vehicle body lower portion structure of a fourth aspect of the disclosure, in the first through third aspects, in a front view seen in the vehicle body longitudinal direction, the reinforcing member is formed in a rectangular shape whose length direction is along a vehicle transverse direction, and the reinforcing member has one or more sectioning walls that section an interior of the second chamber of the reinforcing member into plural spaces.

In accordance with the vehicle body lower portion structure of the fourth aspect, in the front view seen in the vehicle body longitudinal direction, the interior of the second chamber of the reinforcing member, which is formed in a rectangular shape whose length direction is along the vehicle transverse direction, is sectioned into plural spaces by one or more sectioning walls. Accordingly, deformation that is such that the reinforcing member opens wide is suppressed, as compared with a reinforcing member at which a sectioning wall is not provided within the second chamber thereof. Accordingly, the buckling stress of the reinforcing member with respect to the collision load that is inputted at the time of a side collision of the vehicle is increased.

In a vehicle body lower portion structure of a fifth aspect of the disclosure, in the fourth aspect, in the front view seen from the vehicle body longitudinal direction, the plural projections are formed at same positions in the vehicle transverse direction as positions at which vehicle transverse direction side walls of the reinforcing member and vehicle body vertical direction end portions of the one or more sectioning wall are located.

In accordance with the vehicle body lower portion structure of the fifth aspect, in the front view seen in the vehicle body longitudinal direction, the plural projections are formed at the same positions in the vehicle transverse direction as the positions at which the vehicle transverse direction side walls of the reinforcing member and the vehicle body vertical direction end portions of the one or more sectioning wall are located. Accordingly, when the reinforcing member deforms so as to open wide, reaction force from the guide portion is effectively obtained via the projections, as compared with a structure in which the plural projections are formed at different positions in the vehicle transverse direction from the positions at which the vehicle transverse direction side walls of the reinforcing member and the vehicle body vertical direction end portions of the one or more sectioning wall are located. Accordingly, the buckling stress of the reinforcing member with respect to the collision load that is inputted at the time of a side collision of the vehicle is increased more.

In a vehicle body lower portion structure of a sixth aspect of the disclosure, in the fourth aspect or the fifth aspect, in the front view seen in the vehicle body longitudinal direction, at least a vehicle transverse direction innermost space among plural spaces that are sectioned by the sectioning wall is made to be smallest among the plural spaces.

In accordance with the vehicle body lower portion structure of the sixth aspect, in the front view seen in the vehicle body longitudinal direction, at least the vehicle transverse direction innermost space, among the plural spaces that are sectioned by the sectioning wall, is made to be smallest among the plural spaces. Accordingly, at the vehicle transverse direction outer side portion with respect to the vehicle transverse direction innermost side portion, the reinforcing member has a portion where the rigidity is low. The deformation mode of the reinforcing member toward the vehicle transverse direction inner side due to the collision load that is inputted at the time of a side collision of the vehicle is stabilized.

In a vehicle body lower portion structure of a seventh aspect of the disclosure, in the first through sixth aspects, the lower frame member and the guide portion are formed integrally.

In accordance with the vehicle body lower portion structure of the seventh aspect, the lower frame member and the guide portion are formed integrally. Accordingly, the produceability of the lower frame member is improved more, as compared with a case in which the lower frame member and the guide portion are structured by separate bodies.

In a vehicle body lower portion structure of an eighth aspect of the disclosure, in the first through seventh aspects, the lower frame member has an upper side chamber portion and a lower side chamber portion, and at least a portion of the guide portion is structured by a partitioning wall that partitions the upper side chamber portion and the lower side chamber portion.

In accordance with the vehicle body lower portion structure of the eighth aspect, at least a portion of the guide portion is structured by the partitioning wall that partitions the upper side chamber portion and the lower side chamber portion of the lower frame member. Accordingly, the produceability of the lower frame member is improved, as compared with a case in which the guide portion is not structured by the partitioning wall. Further, the rigidity of the lower frame member is improved by the partitioning wall.

In a vehicle body lower portion structure of a ninth aspect of the disclosure, in the eighth aspect, the lower frame member has, between the upper side chamber portion and the lower side chamber portion, an intermediate chamber portion that is structured to include the partitioning wall, and the reinforcing member is provided within a third chamber at the intermediate chamber portion.

In accordance with the vehicle body lower portion structure of the ninth aspect, the intermediate chamber portion is formed so as to include the partitioning wall, between the upper side chamber portion and the lower side chamber portion of the lower frame member. The reinforcing member is provided within the third chamber at this intermediate chamber portion. Accordingly, the buckling stress of the lower frame member with respect to the collision load that is inputted at the time of a side collision of the vehicle is increased, and deformation of the vehicle cabin is suppressed.

In a vehicle body lower portion structure of a tenth aspect of the disclosure, in the eighth aspect or the ninth aspect, a maximum width of the upper side chamber portion in the vehicle transverse direction is shorter than a length of the reinforcing member in the vehicle transverse direction.

In accordance with the vehicle body lower portion structure of the tenth aspect, the maximum width of the upper side chamber portion in the vehicle transverse direction is made to be shorter than the length of the reinforcing member in the vehicle transverse direction. Accordingly, the space of the vehicle cabin in the vehicle transverse direction is broadened, and the flexibility in the design of the vehicle cabin layout increases.

In a vehicle body lower portion structure of an eleventh aspect of the disclosure, in the first through tenth aspects, the lower frame member is structured by a rocker that extends in the vehicle body longitudinal direction, and by an energy absorbing member that is formed as a fourth chamber that extends in the vehicle body longitudinal direction, and that is disposed at a vehicle body lower side of the rocker.

In accordance with the vehicle body lower portion structure of the eleventh aspect, the lower frame member is structured by the rocker and the energy absorbing member that is disposed at the vehicle body lower side of the rocker. Namely, the reinforcing member is provided at the rocker or the energy absorbing member. Accordingly, the buckling stress of the lower frame member with respect to the collision load that is inputted at the time of a side collision of the vehicle is increased more, and deformation of the vehicle cabin is suppressed.

BRIEF DESCRIPTION OF THE DRAWINGS

Preferred embodiments will be described in detail based on the following figures, wherein.

DETAILED DESCRIPTION

Embodiments relating to the present disclosure are described in detail hereinafter on the basis of the drawings. Note that, for convenience of explanation, arrow UP that is shown appropriately in the respective drawings is the vehicle body upward direction, arrow FR is the vehicle body frontward direction, and arrow LH is the vehicle body leftward direction. Further, in the following description, when vertical, longitudinal, and left-right directions are used without being specified, they refer to the vertical of the vehicle body vertical direction, the longitudinal of the vehicle body longitudinal direction, and the left and the right of the vehicle body left-right direction (the vehicle transverse direction).

First Embodiment

Figure 1:
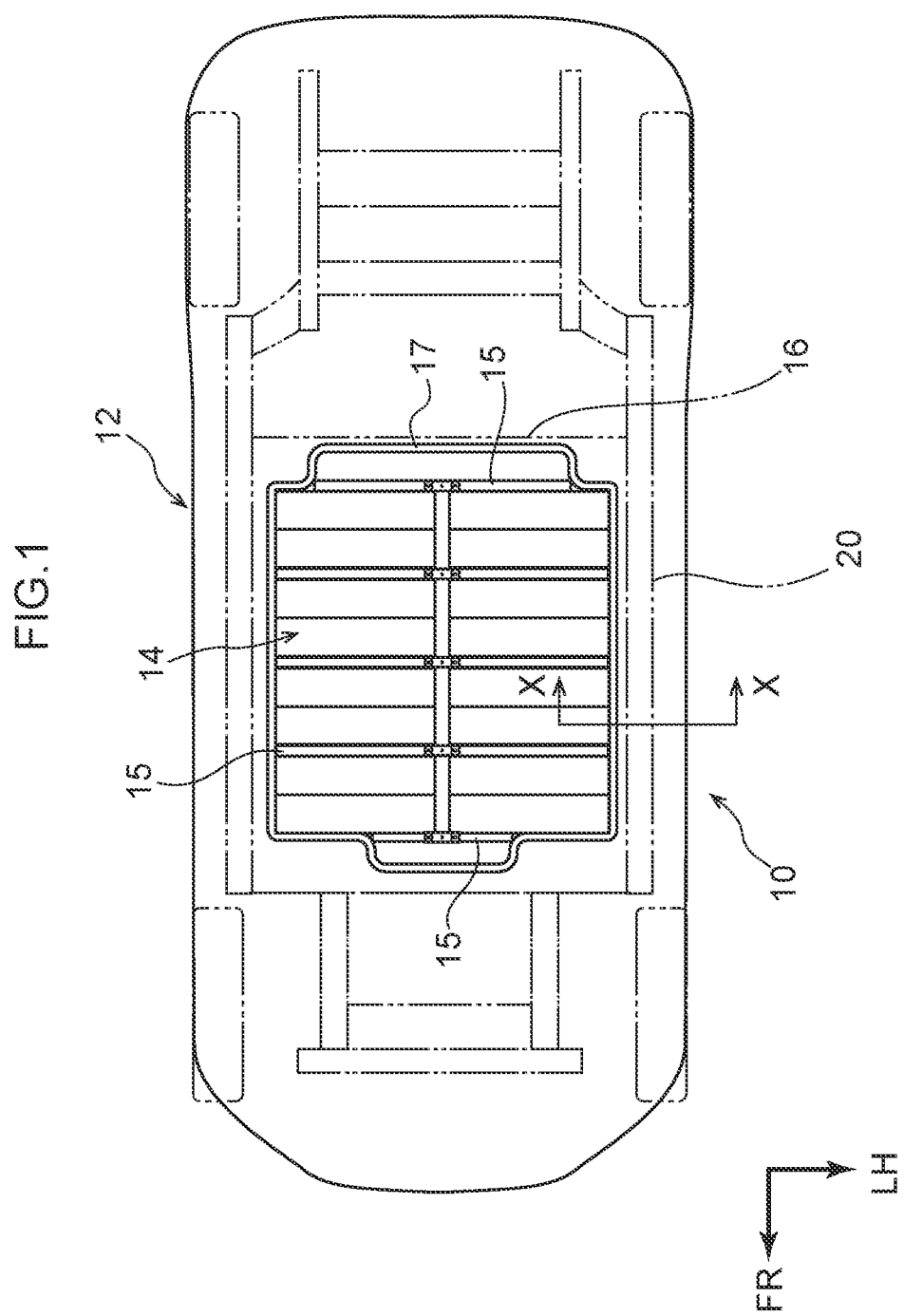
FIG. 1 is a plan view of a vehicle that has a vehicle body lower portion structure relating to a present embodiment.

First, a vehicle body lower portion structure 10 relating to a first embodiment is described. As shown in FIG. 1, at a vehicle 12 that is equipped with the vehicle body lower portion structure 10 relating to the present embodiment, a battery 14 is installed at the entire surface beneath the floor of the vehicle cabin in order to extend the drivable distance. The battery 14 is structured by plural (e.g., 8 rows in the vehicle body longitudinal direction×two rows in the vehicle transverse direction) storage batteries. The exterior of the battery 14 is a case that is shaped as a rectangular box and that is relatively hard such that it is difficult to plastically deform even if collision load is inputted thereto.

Figure 2:
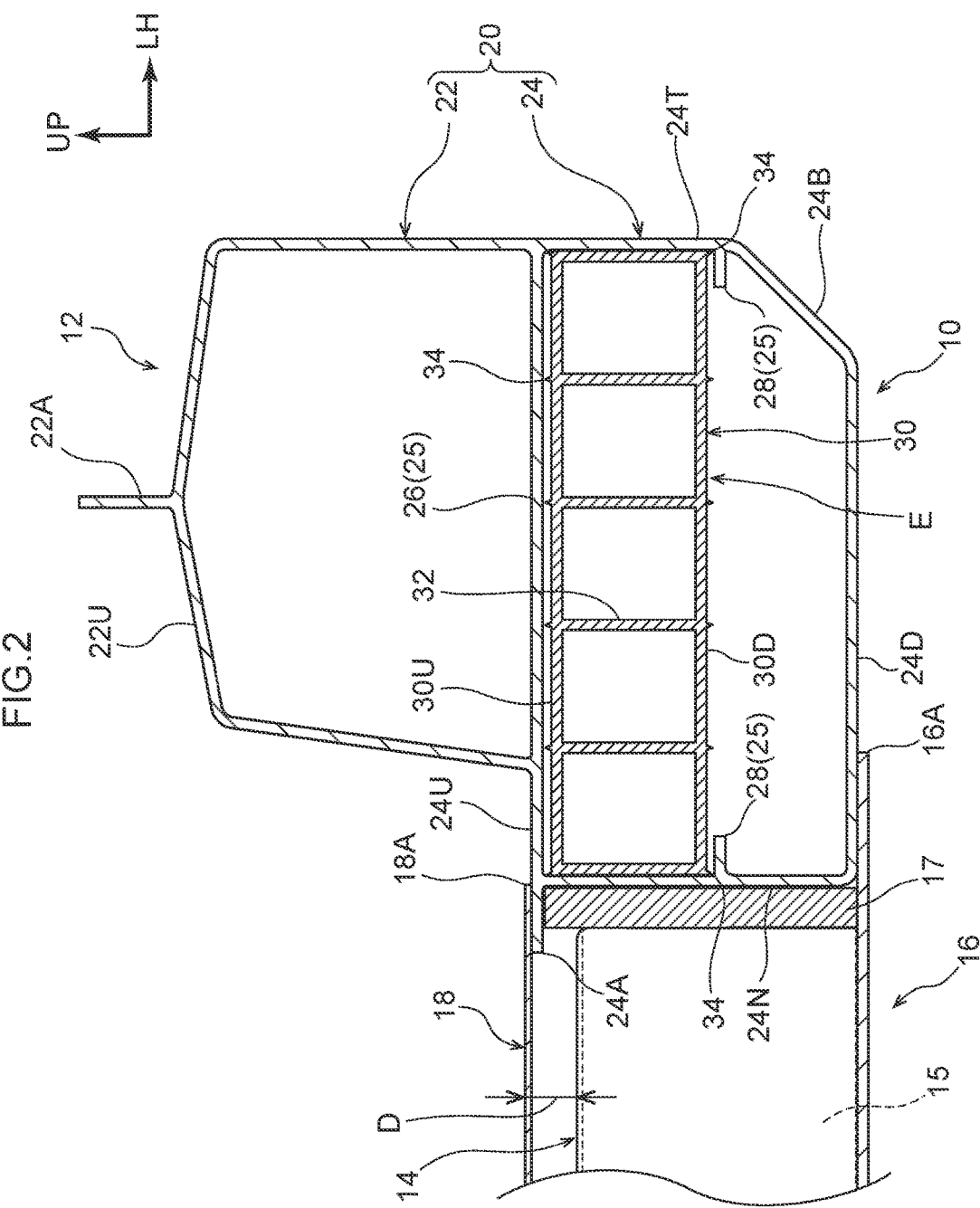
FIG. 2 is a cross-sectional view seen in the direction of the X-X arrow of FIG. 1, showing a vehicle body lower portion structure relating to a first embodiment.

Further, as shown in FIG. 1 and FIG. 2, the battery 14 is installed on the top surface of a battery frame 16 that is shaped as a tray. A peripheral wall 17 stands upright at the outer peripheral portion of the battery frame 16. Plural cross walls 15, which serve as cross members and extend in the vehicle transverse direction, stand erect at the top surface of the battery frame 16 at intervals in the vehicle body longitudinal direction. The respective cross walls 15 stand erect at a height that is slightly lower than that of the peripheral wall 17. The storage batteries are disposed so as to be separated four-by-four by the respective cross walls 15 (see FIG. 1).

Rockers 20, which serve as a left-right pair of lower frame members, are disposed at the vehicle transverse direction outer sides of the battery 14. In other words, the battery 14 that is mounted on the battery frame 16 is disposed at the vehicle transverse direction inner sides of the rockers 20. Note that, as shown in FIG. 2, the top surfaces of flange portions 16A, which project-out toward the vehicle transverse direction outer sides from the bottom surface of the peripheral wall 17 of the battery frame 16, are joined to the bottom surfaces of bottom walls 24D of lower side chamber portions 24, which are described later, of the rockers 20.

The rockers 20 are formed as substantially rectangular chamber that extend in the vehicle body longitudinal direction, by extrusion molding of a light-weight metal material (e.g., an aluminum alloy). The rocker 20 is partitioned into an upper side chamber portion 22 and the lower side chamber portion 24 by a partitioning wall 26 that is shaped as a flat plate and functions as a guide portion 25 at the time of inserting a reinforcing member 30 that is described later.

In a front view seen from the vehicle body front side, in other word the front view is seen in the vehicle front-rear direction (the same is applied hereafter), and shown in FIG. 2, the vehicle transverse direction outer side end of the lower side chamber portion 24 is flush with the vehicle transverse direction outer side end of the upper side chamber portion 22. However, the vehicle transverse direction inner side end of the lower side chamber portion 24 projects-out further toward the vehicle transverse direction inner side than the vehicle transverse direction inner side end of the upper side chamber portion 22.

In other words, in the state in which the respective vehicle transverse direction outer side ends of the upper side chamber portion 22 and the lower side chamber portion 24 are flush with one another, the maximum width of the upper side chamber portion 22 is made to be shorter than the maximum width of the lower side chamber portion 24 in the vehicle transverse direction or the length, in the vehicle transverse direction, of the reinforcing member 30 that is described later.

Further, a flange portion 24A that projects out toward the vehicle transverse direction inner side is formed integrally with a top wall 24U that is at the vehicle transverse direction inner side end portion of the lower side chamber portion 24. The top wall 24U projects out further toward the vehicle transverse direction inner side than the vehicle transverse direction inner side end of the upper side chamber portion 22. A vehicle transverse direction outer side end 18A of a floor panel 18 that structures the floor of the vehicle cabin is joined to the top surface of the flange portion 24A or to the top surface of the top wall 24U that includes the flange portion 24A.

Note that the top wall 24U at the vehicle transverse direction inner side end of the lower side chamber portion 24 is at a height position that is the same as the partitioning wall 26. Namely, the top wall 24U and the flange portion 24A are disposed on a line of extension of the partitioning wall 26 toward the vehicle transverse direction inner side. Further, the battery 14 is disposed further toward the vehicle body lower side than the floor panel 18 with a gap D (see FIG. 2) therebetween.

In the front view, a flange portion 22A, which is shaped as a flat plate and extends in the vehicle body longitudinal direction with the vehicle transverse direction being the normal direction thereof, is formed integrally with the substantially central portion in the vehicle transverse direction of the top surface (the outer surface) of a top wall 22U of the upper side chamber portion 22. Further, an inclined portion 24B, which is inclined upwardly toward the vehicle transverse direction outer side, is formed at the vehicle transverse direction outer side and at the lower end portion of the lower side chamber portion 24. The inclined portion 24B integrally connects an outer side wall 24T and the bottom wall 24D that are described later.

Moreover, guide walls 28, which are rib-shaped and serve as the guide portion 25 and that project-out into the chamber along the vehicle transverse direction respectively, are formed integrally at the inner surface of the outer side wall 24T and the inner surface of an inner side wall 24N. The outer side wall 24T and the inner side wall 24N form a part of the chamber of the lower side chamber portion 24. Namely, the guide portion 25 relating to the present embodiment is structured by the partitioning wall 26 and the guide walls 28.

Note that the projecting length along the vehicle transverse direction of the guide walls 28 is not particularly limited, but, for example, is a length of an extent that is such that the guide walls 28 can support, at least from the vehicle body lower side, projections 34 that are formed at the vehicle transverse direction both end portions of the bottom outer surface of a bottom wall 30D of the reinforcing member 30 that is described later.

Further, the reinforcing member 30 that is for improving the rigidity of the rocker 20 is provided by being inserted from the vehicle body front side or the vehicle body rear side into the region (hereinafter called "insertion portion E") at the interior of the chamber of the lower side chamber portion 24 which region is surrounded by the partitioning wall 26, the outer side wall 24T, a portion of the inner side wall 24N, and the guide walls 28.

Figure 3:
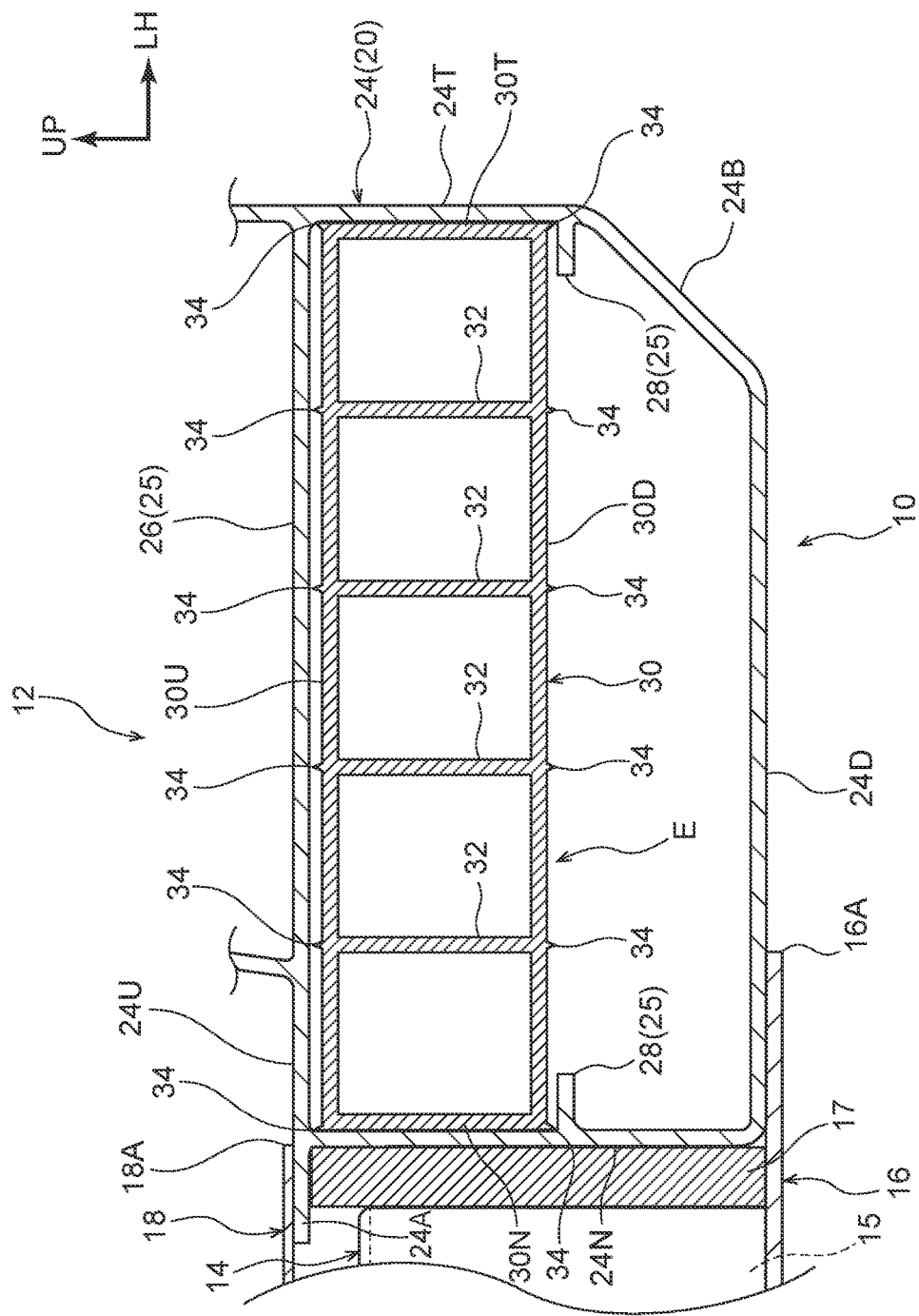
FIG. 3 is a partial, enlarged sectional view of FIG. 2, showing the vehicle body lower portion structure relating to the first embodiment.

As shown in FIG. 3, the reinforcing member 30 is formed as a rectangular chamber that extends in the vehicle body longitudinal direction, by extrusion molding of a lightweight metal material (e.g., an aluminum alloy). The length direction of this rectangular chamber is along the vehicle transverse direction, in the front view. Further, plural (e.g., four) sectioning walls 32, which section the interior of the chamber of the reinforcing member 30, are formed integrally with the reinforcing member 30.

The respective sectioning walls 32 are formed in the shapes of flat plates that extend in the vehicle body longitudinal direction with the vehicle transverse direction being the normal direction thereof, and are disposed so as to section the interior of the chamber of the reinforcing member 30 into, for example, uniform intervals in the vehicle transverse direction. Further, the plural projections 34 that respectively extend in the vehicle body longitudinal direction are formed integrally with the top surface (the outer surface) of a top wall 30U and the bottom surface (the outer surface) of the bottom wall 30D that serve as wall portions that are flat-plate-shaped and structure the chamber of the reinforcing member 30.

In detail, in the front view, each of the projections 34 is formed so as to, with the top surface of the top wall 30U or the bottom surface of the bottom wall 30D, form a substantially isosceles triangular shape or a substantially equilateral triangular shape. The projections 34 are structured such that only the peak portions thereof contact the bottom surface of the partitioning wall 26 and the top surfaces of the guide walls 28. Namely, the reinforcing member 30 is provided by being inserted into the insertion portion E, which is formed within the chamber of the lower side chamber portion 24 of the rocker 20, while only the peak portions of the plural projections 34 are made to contact the bottom surface of the partitioning wall 26 and the top surfaces of the guide walls 28.

Further, in particular the projections 34, which are formed at the vehicle transverse direction both end portions of the bottom surface of the bottom wall 30D of the reinforcing member 30, are disposed in states of being supported on the top surfaces of the guide walls 28 from the vehicle body lower side. Note that the respective projections 34 are disposed at the same positions in the vehicle transverse direction with respect to positions at which the vehicle transverse direction both end portions of the top surface of the top wall 30U and the bottom surface of the bottom wall 30D of the reinforcing member 30 are located. In other word, the respective projections 34 are disposed at the same positions with respect to the vehicle body vertical direction both end portions of an outer side wall 30T and an inner side wall 30N of the reinforcing member 30, and with respect to the vehicle body vertical direction both end portions of the sectioning walls 32.

Operation of the vehicle body lower portion structure 10, which relates to the first embodiment and is structured as described above, is described next.

As described above, the reinforcing member 30 is provided by being inserted into the insertion portion E while the peak portions of the plural projections 34, which are formed integrally with the top surface of the top wall 30U and the bottom surface of the bottom wall 30D of the reinforcing member 30, are made to contact the bottom surface of the partitioning wall 26 and the top surfaces of the guide walls 28. Accordingly, the frictional resistance of the reinforcing member 30 with respect to the bottom surface of the partitioning wall 26 and the top surfaces of the guide walls 28 can be lessened as compared with a case in which the reinforcing member 30 is inserted into the insertion portion E while the top surface of the top wall 30U and the bottom surface of the bottom wall 30D thereof are made to contact the bottom surface of the partitioning wall 26 and the top surfaces of the guide walls 28.

Namely, in accordance with the present embodiment, the frictional force at the time of inserting the reinforcing member 30 into the rocker 20 can be reduced, and the produceability of the rocker 20 can be improved. Moreover, because the rocker 20 and the partitioning wall 26 and the guide walls 28 are formed integrally, the produceability of the rocker 20 can be further improved as compared with a case in which the rocker 20 and the partitioning wall 26 and the guide walls 28 are formed as separate bodies.

Further, at least a portion of the guide portion 25 is formed by the partitioning wall 26 that partitions the upper side chamber portion 22 and the lower side chamber portion 24 of the rocker 20. Therefore, the produceability of the rocker 20 can be further improved as compared with a case in which the guide portion 25 is not formed by the partitioning wall 26. Note that, owing due to partitioning wall 26, there is also the advantage that the rigidity of the rocker 20 with respect to load inputted from the vehicle transverse direction outer side can be improved.

Further, in the front view, the interior of the chamber of the reinforcing member 30 is partitioned into plural spaces by the plural sectioning walls 32. Therefore, the rigidity of the reinforcing member 30 with respect to the collision load that is inputted at the time of a side collision of the vehicle 12, i.e., the buckling stress, can be increased as compared with that of a reinforcing member at which the sectioning members 32 are not provided within the chamber thereof in which the lengths in the vehicle transverse direction of the top wall 30U and the bottom wall 30D are not divided by the sectioning walls 32 (a structure not illustrated).

Further, in the front view, the plural projections 34 are formed at the same positions in the vehicle transverse direction as positions at which the vehicle body vertical direction both end portions of the sectioning walls 32, and the vehicle body vertical direction both end portions of the outer side wall 30T and the inner side wall 30N are located. Therefore, reaction force from the partitioning wall 26 and the guide walls 28 is effectively obtained via the projections 34 at the time when the reinforcing member 30 deforms so as to open wide (the time when the top wall 30U plastically deforms toward the vehicle body upper side and the bottom wall 30D plastically deforms toward the vehicle body lower side), as compared with a structure in which the plural projections are formed at positions that are different, in the vehicle transverse direction, from the positions at which the vehicle body vertical direction both end portions of the sectioning walls 32 and the vehicle body vertical direction both end portions of the outer side wall 30T and the inner side wall 30N are located.

Accordingly, the buckling stress of the reinforcing member 30 with respect to the collision load that is inputted at the time of a side collision of the vehicle 12 can be further increased. Namely, in accordance with the vehicle body lower portion structure 10 relating to the present embodiment, both an improvement in the produceability of the rocker 20 and an improvement in the rigidity (an improvement in the efficiency of the energy absorption at the time of a side collision of the vehicle 12) of the rocker 20 and the reinforcing member 30 can be realized simultaneously.

Further, the maximum width of the upper side chamber portion 22 in the vehicle transverse direction is made to be shorter than the maximum with of the lower side chamber portion 24 in the vehicle transverse direction and the length of the reinforcing member 30 in the vehicle transverse direction, in the state in which the vehicle transverse direction outer side end portion of the upper side chamber portion 22 and the vehicle transverse direction outer side end portion of the lower side chamber portion 24 are flush with one another.

Accordingly, the length of the floor panel 18 in the vehicle transverse direction can be made to be long, and the vehicle cabin space can be broadened by that much, as compared with a structure in which, for example, the maximum width of the upper side chamber portion 22 is made to be the same length as the maximum length of the lower side chamber portion 24 and the length of the reinforcing member 30 in the vehicle transverse direction.

Further, in a side view seen from a vehicle body right side or a vehicle body left side, in other word the side view is seen in the vehicle transverse direction (the same is applied hereafter), at least a portion of the reinforcing member 30 overlaps with the battery 14 or the battery frame 16. Accordingly, the collision load that is inputted at the time of a side collision of the vehicle 12 is efficiently transmitted via the reinforcing member 30 to the battery 14 or the battery frame 16, as compared with a structure in which the reinforcing member 30 does not overlap with the battery 14 or the battery frame 16 in the side view. Accordingly, deformation of the vehicle cabin can be suppressed, and the collision safety performance at the time of a side collision of the vehicle 12 can be improved.

Note that, as described above, the exterior of the battery 14 in the present embodiment is structured by a relatively hard case, and the battery 14 is made to be a structure that is difficult to plastically deform even if collision load is inputted thereto. Accordingly, even if collision load is inputted to the battery 14, the interior of the battery 14 can be protected.

Namely, in accordance with the present embodiment, the collision load that is inputted at the time of a side collision of the vehicle 12 can be transmitted to the battery 14. Therefore, a load transmitting member for transmitting the collision load can be made to be light-weight or can be omitted. Accordingly, a good load resistance performance can be obtained without increasing the weight of the vehicle 12.

Second Embodiment

The vehicle body lower portion structure 10 relating to a second embodiment is described next. Note that regions that are equivalent to those of the above-described first embodiment are denoted by the same reference numerals, and detailed description thereof (including description of common operation) is omitted as appropriate.

Figure 4:
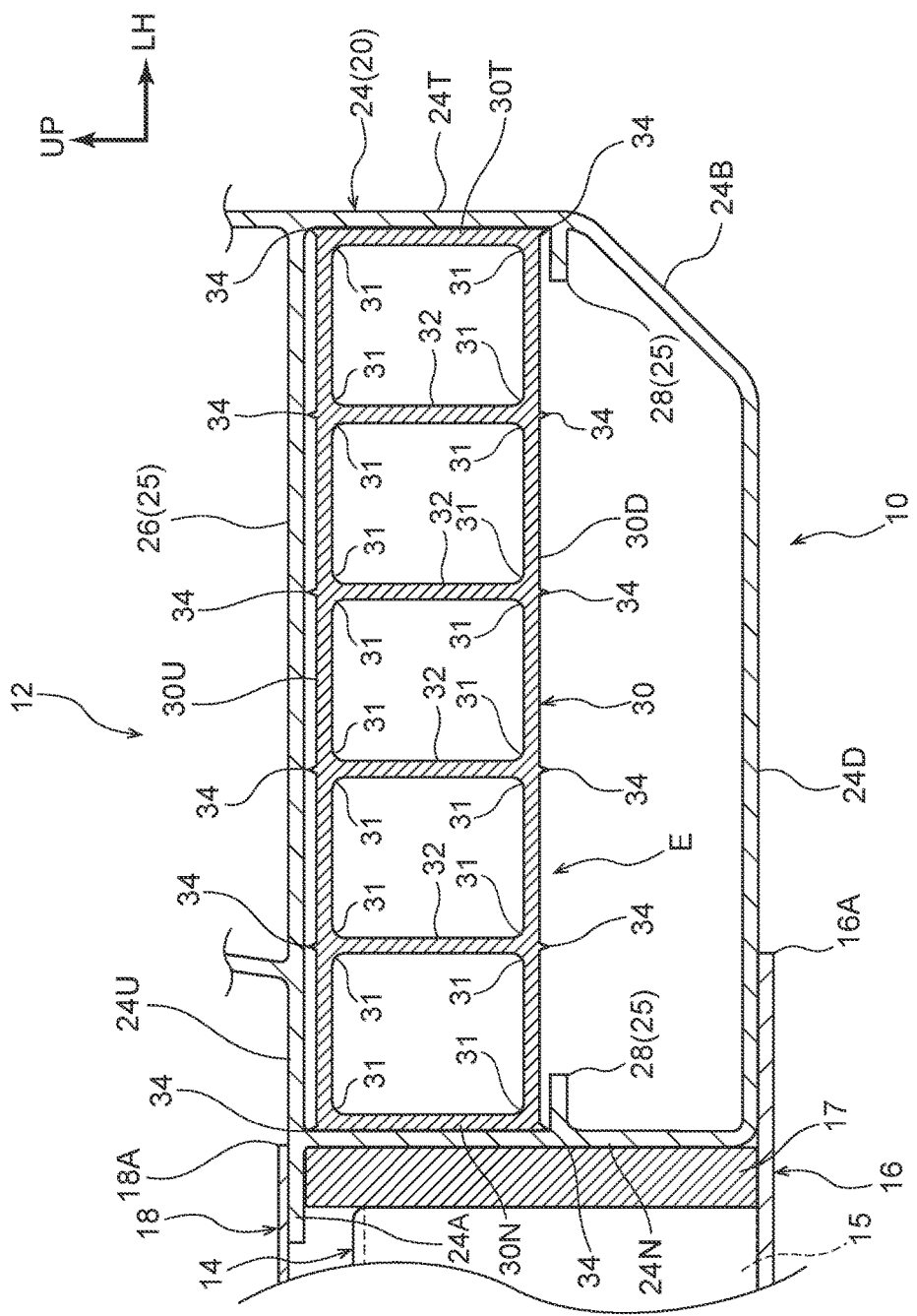
FIG. 4 is a cross-sectional view that corresponds to FIG. 3 and shows a vehicle body lower portion structure relating to a second embodiment.

As shown in FIG. 4, in the vehicle body lower portion structure 10 relating to the second embodiment, at the reinforcing member 30, corner portions 31 formed at the vehicle body vertical direction both end portions, at which the bottom surface of the top wall 30U and the top surface of the bottom wall 30D, and inner surfaces of the sectioning walls 32, intersect one another, are formed in arc-shapes in the front view. The inner surfaces of the sectioning walls 32 face toward the vehicle transverse direction inner side or face toward the vehicle transverse direction outer side. The plate thickness of the portions of the top wall 30U and the bottom wall 30D is increased at the respective corner portions 31. Namely, the rigidity of the top wall 30U and the bottom wall 30D that include the respective corner portions 31 is improved.

Accordingly, in addition to the operation of the vehicle body lower portion structure 10 relating to the above-described first embodiment, when the reinforcing member 30 deforms so as to open wide at the time of a side collision of the vehicle 12, the reaction force from the partitioning wall 26 and the guide walls 28 is more effectively obtained via the projections 34. Accordingly, the buckling stress of the reinforcing member 30 with respect to the collision load that is inputted at the time of a side collision of the vehicle 12 can be increased more. Note that, at the reinforcing member 30, the corner portions 31, at which the bottom surface of the top wall 30U and the top surface of the bottom wall 30D, and the inner surfaces of the outer side wall 30T and the inner side wall 30N, intersect one another, also are formed in arc-shapes in a front view seen from the vehicle body longitudinal direction.

Third Embodiment

The vehicle body lower portion structure 10 relating to a third embodiment is described next. Note that regions that are equivalent to those of the above-described first embodiment and second embodiment are denoted by the same reference numerals, and detailed description thereof (including description of common operation) is omitted as appropriate.

Figure 5:
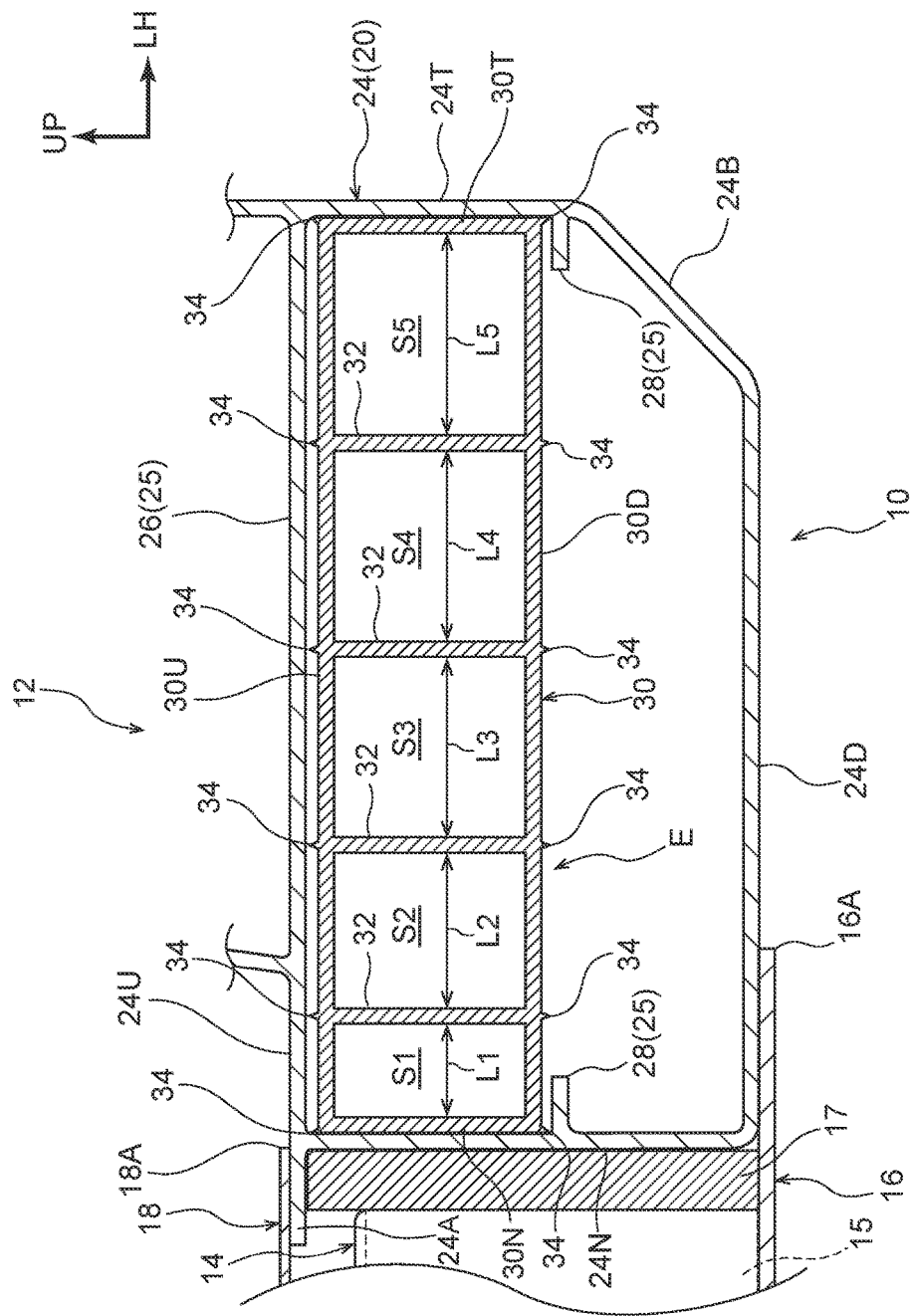
FIG. 5 is a cross-sectional view that corresponds to FIG. 3 and shows a vehicle body lower portion structure relating to a third embodiment.

As shown in FIG. 5, in the vehicle body lower portion structure 10 relating to the third embodiment, in the front view, plural (e.g., five) spaces Si through S5 are sectioned by the respective sectioning walls 32 of the reinforcing member 30. Intervals L1 through L5 of the spaces S1 through S5, which run along the vehicle transverse direction, are structured so as to gradually become longer from the vehicle transverse direction inner side toward the vehicle transverse direction outer side.

Namely, the positions of the respective sectioning walls 32 are set appropriately such that the intervals L1 through L5 along the vehicle transverse direction of the five spaces S1 through S5 of the reinforcing member 30 gradually become longer from the vehicle transverse direction inner side toward the vehicle transverse direction outer side.

Accordingly, in addition to the operation of the vehicle body lower portion structure 10 relating to the above-described first embodiment, the rigidity of the reinforcing member 30 can be made to become gradually higher from the vehicle transverse direction outer side portion toward the vehicle transverse direction inner side portion. Accordingly, the deformation mode of the reinforcing member 30 toward the vehicle transverse direction inner side due to the collision load that is inputted at the time of a side collision of the vehicle 12 can be made gradually, and deformation of the vehicle cabin can be decreased or prevented.

Note that, in the illustrated reinforcing member 30, the intervals L1 through L5 of the spaces S1 through S5 gradually become longer from the vehicle transverse direction inner side toward the vehicle transverse direction outer side, but are not limited to this.

In the present embodiment, it suffices for there to be a structure in which at least the interval L1 of the space S1 that is at the vehicle transverse direction innermost side is shorter than any one of the intervals L2 through L5 of the other spaces S2 through S5. Accordingly, although not illustrated, for example, only the interval L1 of the space S1 may be structured to be shorter than the intervals L2 through L5 along the vehicle transverse direction of the remaining spaces S2 through S5, and the intervals L2 through L5 of these remaining spaces S2 through S5 are structured to be the same.

Fourth Embodiment

The vehicle body lower portion structure 10 relating to a fourth embodiment is described next. Note that regions that are equivalent to those of the above-described first embodiment through third embodiment are denoted by the same reference numerals, and detailed description thereof (including description of common operation) is omitted as appropriate.

Figure 6:
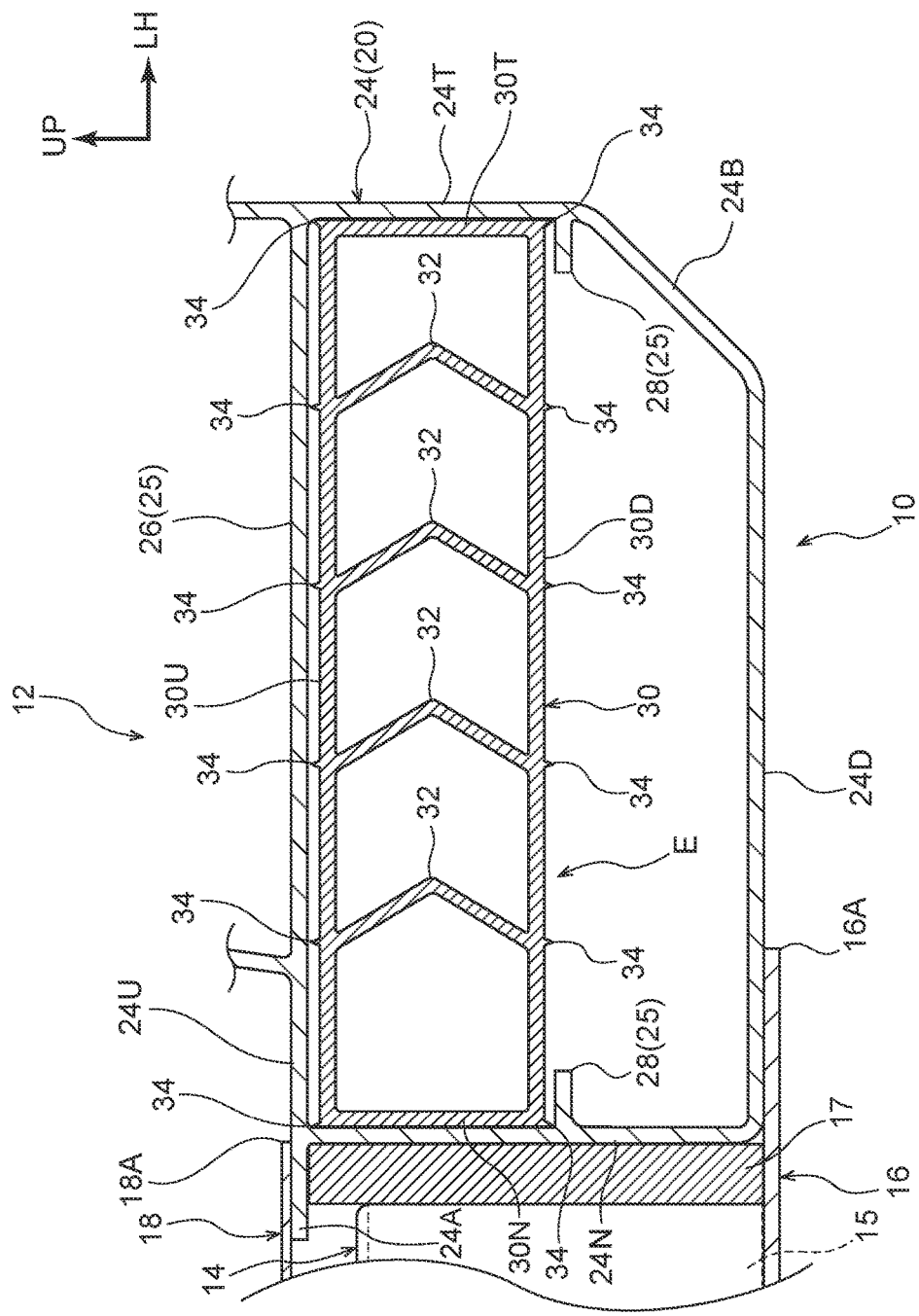
FIG. 6 is a cross-sectional view that corresponds to FIG. 3 and shows a vehicle body lower portion structure relating to a fourth embodiment.

As shown in FIG. 6, in the vehicle body lower portion structure 10 relating to the fourth embodiment, in the front view, the sectioning walls 32 of the reinforcing member 30 are formed in bent shapes in which the vehicle body vertical direction central portions thereof are convex in the forms of obtuse angles toward the vehicle transverse direction outer side. Namely, the rigidity of the respective sectioning walls 32 is improved with respect to load inputted from the vehicle transverse direction outer side.

Accordingly, in addition to operation of the vehicle body lower portion structure 10 relating to the above-described first embodiment, when the reinforcing member 30 deforms so as to open wide at the time of a side collision of the vehicle 12, reaction force from the partitioning wall 26 and the guide walls 28 is obtained even more effectively via the projections 34. Accordingly, the buckling stress of the reinforcing member 30 with respect to the collision load that is inputted at the time of a side collision of the vehicle 12 can be increased even more.

Fifth Embodiment

The vehicle body lower portion structure 10 relating to a fifth embodiment is described next. Note that regions that are equivalent to those of the above-described first embodiment through fourth embodiment are denoted by the same reference numerals, and detailed description thereof (including description of common operation) is omitted as appropriate.

Figure 7:
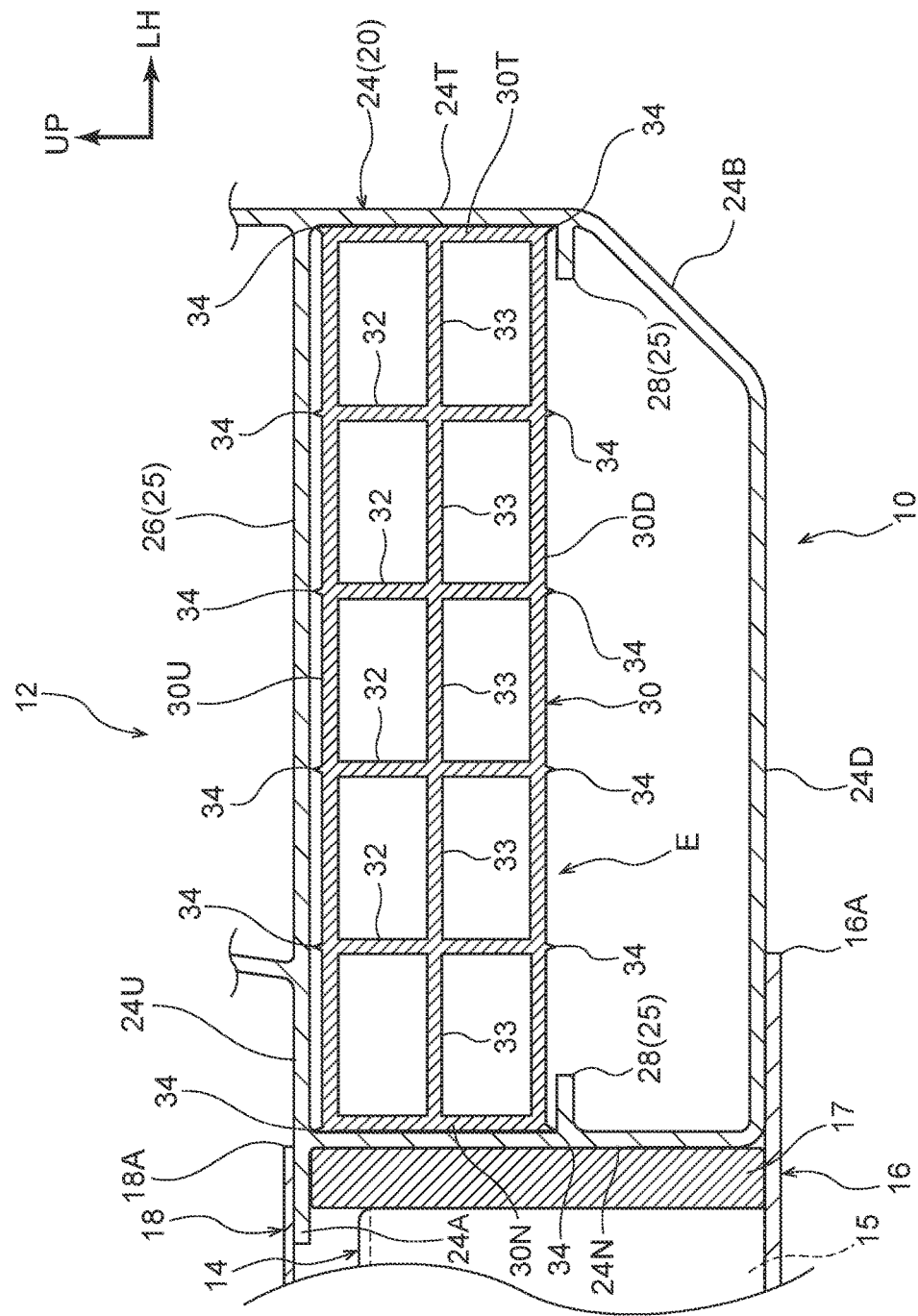
FIG. 7 is a cross-sectional view that corresponds to FIG. 3 and shows a vehicle body lower portion structure relating to a fifth embodiment.

As shown in FIG. 7, in the vehicle body lower portion structure 10 relating to the fifth embodiment, there is a structure in which sectioning walls 33, which extend in the vehicle body longitudinal direction with the vehicle body vertical direction being the normal direction thereof, are further added at the substantially central portions in the vehicle body vertical direction of the sectioning walls 32 of the reinforcing member 30. Namely, this reinforcing member 30 has the sectioning walls 32, 33 that are in the form of a lattice.

Accordingly, in addition to the operation of the vehicle body lower portion structure 10 relating to the above-described first embodiment, energy of the collision load that is inputted from the vehicle transverse direction outer side can be absorbed more effectively due to, in particular, the sectioning walls 33 plastically deforming. Namely, in accordance with the fifth embodiment, the buckling stress of the reinforcing member 30 with respect to the collision load that is inputted at the time of a side collision of the vehicle 12 can be increased even more.

Note that the sectioning walls 32, 33 that are in the form of a lattice at the reinforcing member 30 are not limited to the illustrated structure. For example, although not illustrated, there may be a structure in which sectioning walls, which extend in the vehicle body longitudinal direction with the vehicle body vertical direction being the normal direction thereof, are further added at a predetermined interval in the vehicle body vertical direction with respect to the sectioning walls 33. Or, there may be a structure in which sectioning walls, which extend in the vehicle body longitudinal direction with the vehicle transverse direction being the normal direction thereof, are further added at a predetermined interval in the vehicle transverse direction with respect to the sectioning walls 32.

Sixth Embodiment

The vehicle body lower portion structure 10 relating to a sixth embodiment is described next. Note that regions that are equivalent to those of the above-described first embodiment through fifth embodiment are denoted by the same reference numerals, and detailed description thereof (including description of common operation) is omitted as appropriate.

Figure 8:
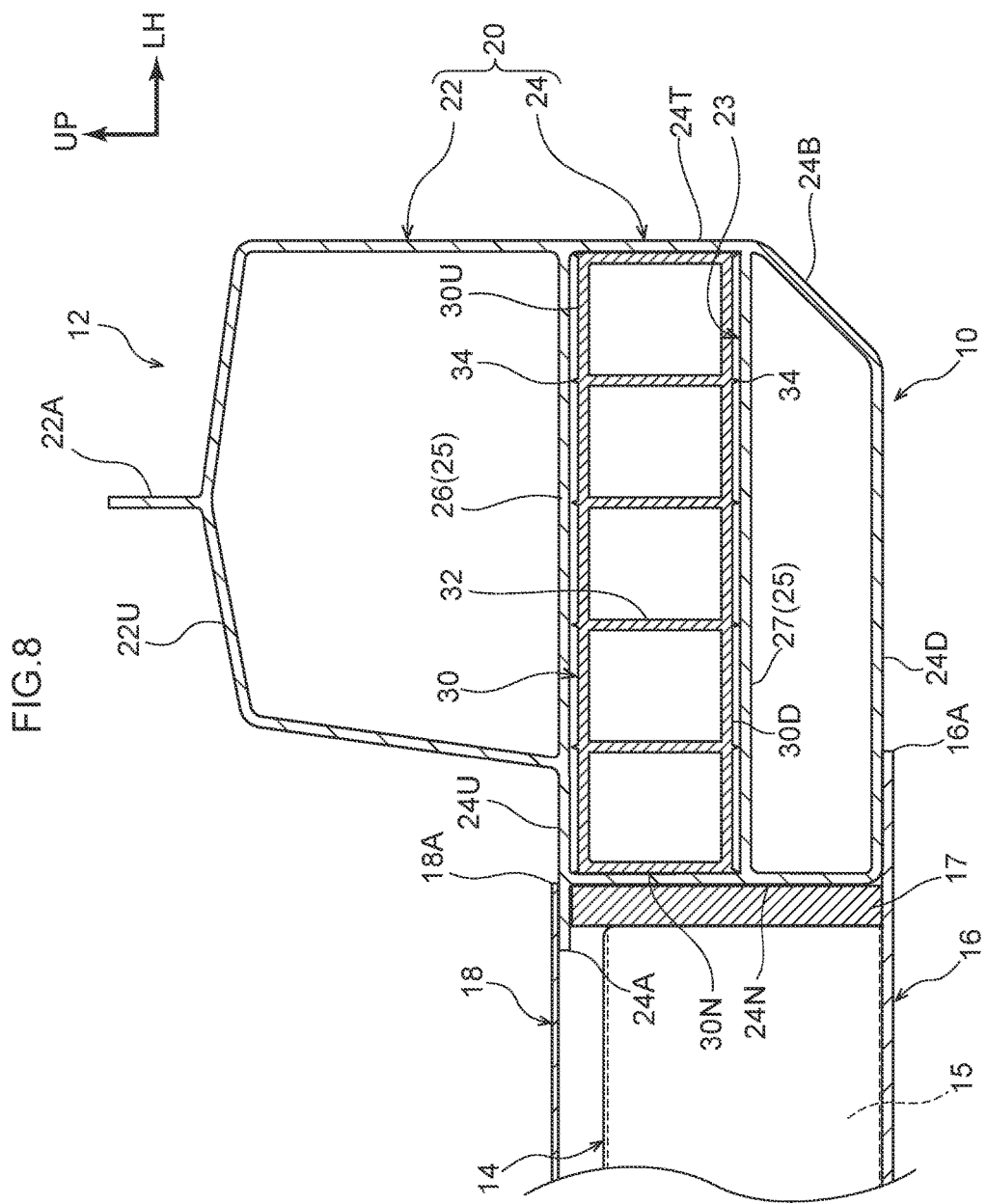
FIG. 8 is a cross-sectional view that corresponds to FIG. 2 and shows a vehicle body lower portion structure relating to a sixth embodiment.

As shown in FIG. 8, in the vehicle body lower portion structure 10 relating to the sixth embodiment, a lower partitioning wall 27, which serves as the guide portion 25 and which divides the lower side chamber portion 24 into two parts up-and-down, is provided integrally with the rocker 20, separately from the partitioning wall 26 that is provided integrally between the upper side chamber portion 22 and the lower side chamber portion 24. Namely, at the lower side chamber portion 24 of the rocker 20, an intermediate chamber portion 23, which has an internal dimension that is substantially the same as the external dimension of the reinforcing member 30, is formed by the partitioning wall 26, the outer side wall 24T, a portion of the inner side wall 24N, and the lower partitioning wall 27.

Further, the reinforcing member 30 is inserted into the chamber of this intermediate chamber portion 23 from the vehicle body front side or the vehicle body rear side. Namely, the reinforcing member 30 is inserted into the intermediate chamber portion 23 while only the peak portions of the plural projections 34, which are formed integrally with the top surface of the top wall 30U and the bottom surface of the bottom wall 30D of the reinforcing member 30, are made to contact the bottom surface of the partitioning wall 26 and the top surface of the lower partitioning wall 27.

Accordingly, frictional resistance of the reinforcing member 30 with respect to the bottom surface of the partitioning wall 26 and the top surface of the lower partitioning wall 27 can be reduced as compared with a case in which the reinforcing member 30 is inserted into the intermediate chamber portion 23 while the top surface of the top wall 30U and the bottom surface of the bottom wall 30D of the reinforcing member 30 are made to contact the bottom surface of the partitioning wall 26 and the top surface of the lower partitioning wall 27.

Namely, in accordance with the sixth embodiment, even in a structure in which the reinforcing member 30 is inserted into and provided within the intermediate chamber portion 23, the frictional force at the time of inserting the reinforcing member 30 into the intermediate chamber portion 23 can be reduced. Accordingly, the produceability of the rocker 20 can be improved. Further, in accordance with the sixth embodiment, the buckling stress of the rocker 20 with respect to the collision load that is inputted at the time of a side collision of the vehicle 12 can be increased by the lower partitioning wall 27. Therefore, deformation of the vehicle cabin can be reduced more.

Seventh Embodiment

Finally, the vehicle body lower portion structure 10 relating to a seventh embodiment is described. Note that regions that are equivalent to those of the above-described first embodiment through sixth embodiment are denoted by the same reference numerals, and detailed description thereof (including description of common operation) is omitted as appropriate.

Figure 9:
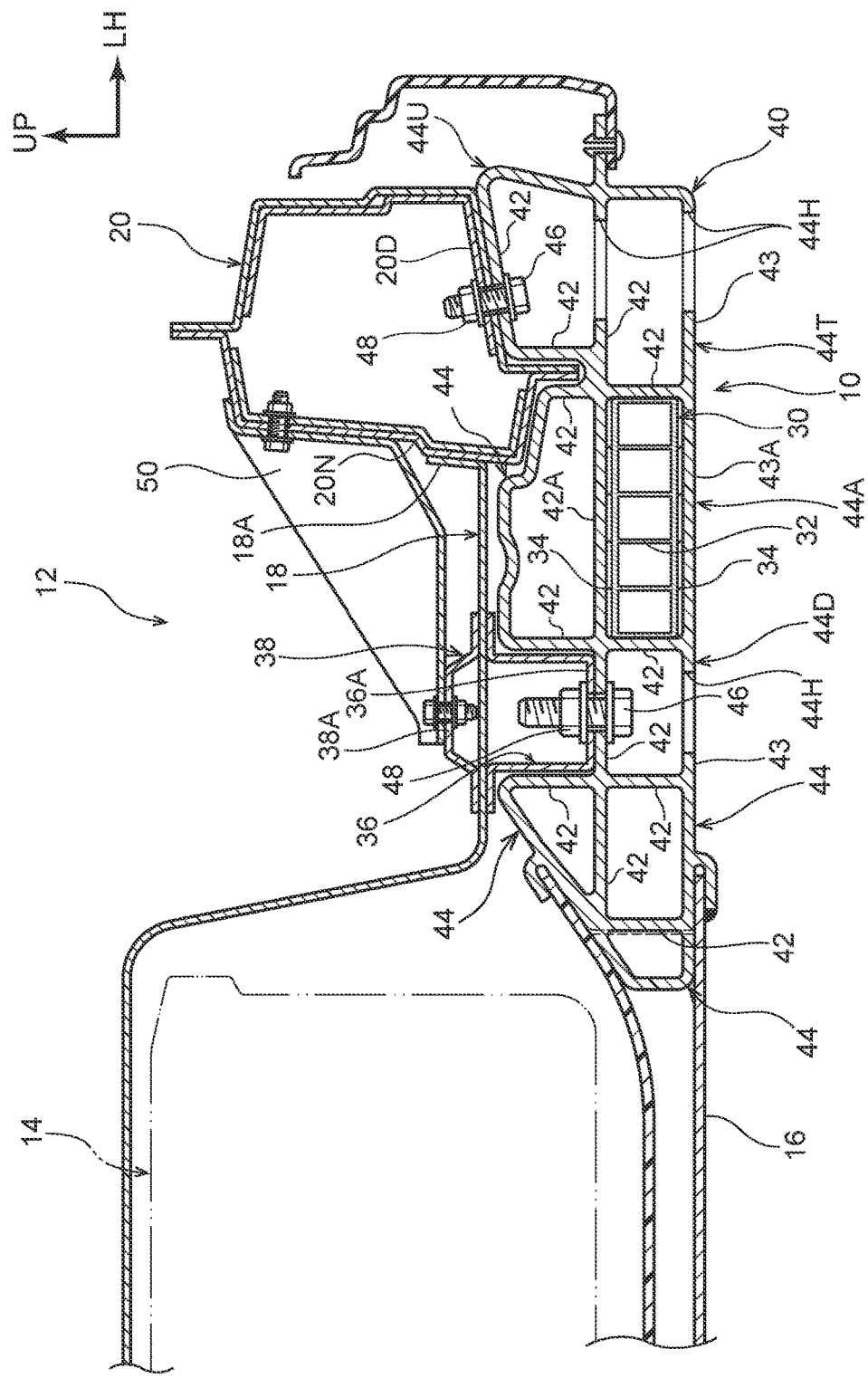
FIG. 9 is a cross-sectional view that corresponds to FIG. 2 and shows a vehicle body lower portion structure relating to a seventh embodiment.

As shown in FIG. 9, in the vehicle body lower portion structure 10 relating to the seventh embodiment, the lower frame member is structured by the rocker 20 that has a chamber structure and extends in the vehicle body longitudinal direction, and an energy absorbing member 40 that is formed as a chamber that extends in the vehicle body longitudinal direction and that is disposed at the vehicle body lower side of the rocker 20 and the floor panel 18 (the floor panel 18 that is provided between the rocker 20 and the battery 14).

The energy absorbing member 40 is formed by extrusion molding of a light-weight metal material (e.g., an aluminum alloy), and, in the front view, is sectioned into plural (e.g., two rows in the vehicle body vertical direction×five rows in the vehicle transverse direction) sections 44 by plural partitioning walls 42. Further, section 44U that is formed at the upper portion of the vehicle transverse direction outer side is fastened by a bolt 46 and a weld nut 48 to a bottom wall 20D of the rocker 20. Section 44D that is formed at the lower portion of the vehicle transverse direction inner side is fastened by the bolt 46 and the weld nut 48 to a bottom wall 36A of an under member 36 that is joined to the bottom surface of the floor panel 18.

Note that work holes 44H for the insertion and screwing of the bolts 46 are respectively formed in the partitioning wall 42 that is at the vehicle body lower side of the section 44U, and in a bottom wall 43 of a section 44T and the section 44D that are at the vehicle body lower side of the section 44U. Further, the under member 36 is formed in the shape of a hat in cross-section, and extends in the vehicle body longitudinal direction. Moreover, an upper member 38, which is formed in the shape of a hat in cross-section and extends in the vehicle body longitudinal direction, is joined to the top surface of the floor panel 18.

Namely, the under member 36 and the upper member 38 are disposed so as to face one another vertically with the floor panel 18 therebetween. Further, a top wall 38A of this upper member 38 and an inner side wall 20N that is disposed at the vehicle transverse direction inner side of the rocker 20 are joined by a connecting member 50. The vehicle transverse direction outer side end portion 18A of the floor panel 18 is bent toward the vehicle body upper side, and is joined to the inner side wall 20N of the rocker 20.

Further, the reinforcing member 30 is provided by being inserted from the vehicle body front side or the vehicle body rear side into at least one of the plural sections 44 of the energy absorbing member 40 (e.g., a section 44A that is formed at the lower portion of the vehicle transverse direction central portion). Namely, the reinforcing member 30 is provided by being inserted into the section 44A while only the peak portions of the plural projections 34, which are formed integrally with the top surface of the top wall 30U and the bottom surface of the bottom wall 30D of the reinforcing member 30, are made to contact the bottom surface of a partitioning wall 42A and a top surface of a bottom wall 43A that structure the section 44A.

Accordingly, the frictional resistance of the reinforcing member 30 with respect to the partitioning wall 42A and the bottom wall 43A can be reduced as compared with a case in which the reinforcing member 30 is inserted into the section 44A while the top surface of the top wall 30U and the bottom surface of the bottom wall 30D of the reinforcing member 30 are made to contact the bottom surface of the partitioning wall 42A and the top surface of the bottom wall 43A that structure the section 44A. Namely, in accordance with the seventh aspect, even in a structure in which the reinforcing member 30 is inserted into and provided within the section 44A, the frictional force at the time of inserting the reinforcing member 30 into the section 44A can be reduced. Accordingly, the produceability of the energy absorbing member 40 can be improved.

Further, in accordance with this seventh embodiment, the buckling stress of the lower frame member, i.e., the rocker 20 and the energy absorbing member 40, with respect to the collision load that is inputted at the time of a side collision of the vehicle 12 can be increased by the connecting member 50 and the reinforcing member 30 respectively. Accordingly, deformation of the vehicle cabin can be further suppressed at the time of a side collision of the vehicle 12.

Note that the section 44 in which the reinforcing member 30 is provided is not limited to the illustrated section 44A. Further, it suffices for the energy absorbing member 40 to have at least one section 44 in which the reinforcing member 30 is provided, and the energy absorbing member 40 itself as well is not limited to the illustrated shape. Further, as in the above-described first embodiment through sixth embodiment, the reinforcing member 30 may be provided within the chamber of the rocker 20. Namely, in the seventh embodiment, it suffices to provide the reinforcing member 30 at least in the section 44 of the energy absorbing member 40.

The vehicle body lower portion structures 10 relating to the present embodiments have been described above on the basis of the drawings. However, the vehicle body lower portion structures 10 relating to the present embodiments are not limited to the illustrated structures, and the designs thereof can be changed appropriately within a scope of the present claims. For example, the number of the sectioning walls 32 is not limited to a plural number, and may be one.

Further, although the respective projections 34 are formed so as to be continuous in the vehicle body longitudinal direction, the projections are not limited to this and may be formed discontinuously in the vehicle body longitudinal direction. Further, the guide walls 28 are not limited to structures that are formed integrally with the rocker 20. For example, the guide walls may be structured so as to be joined by an adhesive or rivets or the like to the inner surface of the outer side wall 24T and the inner surface of the inner side wall 24N of the lower side chamber portion 24 of the rocker 20.

Further, the light-weight metal material is not limited to an aluminum alloy. Moreover, the reinforcing member 30 is not limited to a structure that is formed of a light-weight metal material, and may be formed of, for example, a relatively hard resin material (a so-called engineering plastic) such as polycarbonate (PC) or the like.

Further, there may be a structure in which the first embodiment through the seventh embodiment are combined appropriately. For example, the structure of the reinforcing member 30 in the third embodiment, i.e., the structure in which the intervals L1 through L5 along the vehicle transverse direction of the plural (e.g., five) spaces S1 through S5 gradually become longer from the vehicle transverse direction inner side toward the vehicle transverse direction outer side due to the sectioning walls 32 that are shaped as flat plates, may be applied to the reinforcing member 30 that has the mountain-shaped sectioning walls 32 of the fourth embodiment.

What is claimed is:

1. A vehicle body lower portion structure comprising:
   a lower frame member formed as a chamber that extends in a vehicle body longitudinal direction, having a guide portion at inner surfaces of wall portions that structure the chamber, the lower frame member being disposed at a vehicle body lower side; and
   a reinforcing member formed as a second chamber that extends in the vehicle body longitudinal direction, having a plurality of projections at outer surfaces of wall portions that structure the second chamber, the reinforcing member being provided within the chamber of the lower frame member in a state in which the plurality of projections are made to contact the guide portion.

2. The vehicle body lower portion structure of claim 1, wherein:
   a battery installed on a battery frame is configured to be disposed at a vehicle transverse direction inner side of the lower frame member, and
   in a side view seen in a vehicle transverse direction, at least a portion of the reinforcing member overlaps with the battery or the battery frame.

3. The vehicle body lower portion structure of claim 2, wherein:
   the battery frame has a cross member that extends in the vehicle transverse direction, the battery being sectioned into front and rear portions by the cross member, and at least a portion of the reinforcing member is configured to overlap with the cross member in the side view seen in the vehicle transverse direction.

4. The vehicle body lower portion structure of claim 1, wherein, in a front view seen in the vehicle body longitudinal direction, the reinforcing member is formed in a rectangular shape, a length direction of the reinforcing member is along a vehicle transverse direction, and the reinforcing member has one or more sectioning walls that section an interior of the second chamber of the reinforcing member into plural spaces.

5. The vehicle body lower portion structure of claim 2, wherein, in a front view seen in the vehicle body longitudinal direction, the reinforcing member is formed in a rectangular shape, a length direction of the reinforcing member is along a vehicle transverse direction, and the reinforcing member has one or more sectioning walls that section an interior of the second chamber of the reinforcing member into plural spaces.

6. The vehicle body lower portion structure of claim 3, wherein, in a front view seen in the vehicle body longitudinal direction, the reinforcing member is formed in a rectangular shape, a length direction of the reinforcing member is along a vehicle transverse direction, and the reinforcing member has one or more sectioning walls that section an interior of the second chamber of the reinforcing member into plural spaces.

7. The vehicle body lower portion structure of claim 4, wherein, in the front view seen in the vehicle body longitudinal direction, the plurality of projections are formed at same positions in the vehicle transverse direction as positions at which vehicle transverse direction side walls of the reinforcing member and vehicle body vertical direction end portions of the one or more sectioning walls are located.

8. The vehicle body lower portion structure of claim 5, wherein, in the front view seen in the vehicle body longitudinal direction, the plurality of projections are formed at same positions in the vehicle transverse direction as positions at which vehicle transverse direction side walls of the reinforcing member and vehicle body vertical direction end portions of the one or more sectioning walls are located.

9. The vehicle body lower portion structure of claim 6, wherein, in the front view seen in the vehicle body longitudinal direction, the plurality of projections are formed at same positions in the vehicle transverse direction as positions at which vehicle transverse direction side walls of the reinforcing member and vehicle body vertical direction end portions of the one or more sectioning walls are located.

10. The vehicle body lower portion structure of claim 4, wherein, in the front view seen in the vehicle body longitudinal direction, at least a vehicle transverse direction innermost space among a plurality of spaces that are sectioned by the one or more sectioning walls is made to be smallest among the plurality of spaces.

11. The vehicle body lower portion structure of claim 5, wherein, in the front view seen in the vehicle body longitudinal direction, at least a vehicle transverse direction innermost space among a plurality of spaces that are sectioned by the one or more sectioning walls is made to be smallest among the plurality of spaces.

12. The vehicle body lower portion structure of claim 6, wherein, in the front view seen in the vehicle body longitudinal direction, at least a vehicle transverse direction innermost space among a plurality of spaces that are sectioned by the one or more sectioning walls is made to be smallest among the plurality of spaces.

13. The vehicle body lower portion structure of claim 1, wherein the lower frame member and the guide portion are formed integrally.

14. The vehicle body lower portion structure of claim 1, wherein:
- the lower frame member has an upper side chamber portion and a lower side chamber portion, and
- at least a portion of the guide portion is structured by a partitioning wall that partitions the upper side chamber portion and the lower side chamber portion.

15. The vehicle body lower portion structure of claim 14, wherein:
- the lower frame member has, between the upper side chamber portion and the lower side chamber portion, an intermediate chamber portion that is structured to include the partitioning wall, and
- the reinforcing member is provided within a third chamber at the intermediate chamber portion.

16. The vehicle body lower portion structure of claim 14, wherein a maximum width of the upper side chamber portion in a vehicle transverse direction is shorter than a length of the reinforcing member in the vehicle transverse direction.

17. The vehicle body lower portion structure of claim 1, wherein the lower frame member is structured by a rocker that extends in the vehicle body longitudinal direction, and by an energy absorbing member that is formed as a fourth chamber that extends in the vehicle body longitudinal direction, the energy absorbing member being disposed at a vehicle body lower side of the rocker.

* * * * *